(12) United States Patent
Merrick et al.

(10) Patent No.: US 8,219,279 B2
(45) Date of Patent: Jul. 10, 2012

(54) METHOD FOR ON-BOARD DATA BACKUP FOR CONFIGURABLE PROGRAMMABLE PARAMETERS

(75) Inventors: Andrew D. Merrick, Lombard, IL (US); James Beaucaire, Wheaton, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 1009 days.

(21) Appl. No.: 12/165,766

(22) Filed: Jul. 1, 2008

(65) Prior Publication Data

US 2010/0004812 A1    Jan. 7, 2010

(51) Int. Cl.
G06F 11/00   (2006.01)
G06F 7/00    (2006.01)
G06F 1/24    (2006.01)

(52) U.S. Cl. ......... 701/33.4; 701/36; 714/6.32; 711/162

(58) Field of Classification Search .......... 701/33, 701/35, 29, 115, 1, 29.1, 29.2, 33.4, 34.4, 701/36; 700/82; 711/162; 714/6.32, 3, 4.12, 714/5.1
See application file for complete search history.

(56) References Cited

U.S. PATENT DOCUMENTS

| | | | | |
|---|---|---|---|---|
| 5,561,332 A * | 10/1996 | Udo et al. | ..................... | 307/10.5 |
| 5,706,215 A * | 1/1998 | Woolley et al. | ................. | 702/57 |
| 5,732,381 A * | 3/1998 | Guido et al. | .................. | 701/104 |
| 6,360,161 B1 * | 3/2002 | Francis et al. | ................. | 701/115 |
| 6,434,584 B1 * | 8/2002 | Henderson et al. | ........... | 708/490 |
| 6,615,160 B1 * | 9/2003 | Quinnett et al. | .............. | 702/185 |
| 7,865,672 B2 * | 1/2011 | Ito | ................ | 711/154 |
| 2004/0039500 A1 * | 2/2004 | Amendola et al. | .............. | 701/29 |
| 2006/0085110 A1 * | 4/2006 | Abe | ............................... | 701/29 |
| 2007/0005204 A1 * | 1/2007 | Yamamoto et al. | ............. | 701/35 |

* cited by examiner

Primary Examiner — Thomas G. Black
Assistant Examiner — Christine Behncke
(74) Attorney, Agent, or Firm — Mark C. Bach; Jeffrey P. Calfa

(57) ABSTRACT

A method provides for transferring back-up data between on-board electronic modules of a vehicle. The presence of default parameters is sensed at a first electronic module during a running of the vehicle engine for an engine cycle. The current engine cycle accumulation register data is stored for the engine cycle in the first electronic module. A parameter and accumulation register data recovery routine is run wherein parameters and accumulation register data for the first electronic module are recovered from memory in the second electronic module on the vehicle and restored in the memory of the first electronic module. The information is transferred using SAE J1939 protocol. The first electronic module can be an engine control unit and the second electronic module can be a body controller. During a parameter and data back-up routine periodically run, the first electronic module stores current parameters and accumulation register data into memory of the second electronic module that will serve as back-up parameter and accumulation register data storage in the event the first module loses such parameters and accumulation register data.

6 Claims, 5 Drawing Sheets

METHOD FOR ON-BOARD DATA BACKUP FOR CONFIGURABLE PROGRAMMABLE PARAMETERS

FIELD OF THE INVENTION

The present invention relates to vehicle on-board electronic control modules and vehicle communication networks.

DESCRIPTION OF THE PRIOR ART

Current commercial trucks include a plurality of on-board electronic control modules, examples of which are the Engine Control Module or Unit (ECU), the Body Controller (BC), and the Telematics Control Module or Unit (TCU). All or some of these modules can contain vehicle specific programmable parameters based on features present on the particular vehicle. As an example, one truck may be built with anti-lock (ABS) brakes, another with air brakes and this information must be maintained inside the various electronic control modules for the software algorithms to function properly.

Contemporary designs for the control and management of these electronic control modules rely on computer networking. Digital data is exchanged between component controllers over a common physical layer such as a twisted shielded pair of wires. Intelligible communication between two or more electronic control modules among a greater plurality of devices, all occurring over the common physical layer, depends upon the communicating devices being able to discriminate among messages they receive and respond to those messages directed to them. Such methods are well known in the art and are part of the standards which the Society of Automotive Engineers (SAE) has published and continues to publish as part of the SAE J1939 and the SAE J1587 protocols.

The J1939 protocol provides an open protocol and a definition of the performance requirements of the medium of the physical layer, but also allows for development of proprietary protocols. The SAE J1939 protocol is a specialized application of a controller area network (CAN) and may be readily implemented utilizing commercial integrated circuits such as the C167 Integrated Circuit manufactured by Siemens of Germany.

The CAN protocol is an ISO standard (ISO 11898) for serial data communication, particularly aimed at automotive applications. The CAN standard includes a physical layer (including the data bus) and a data-link layer, which define a few different message types, arbitration rules for bus access and methods for fault detection and fault confinement. The physical layer uses differential transmission on a twisted pair wire bus. A non-destructive bitwise arbitration is used to control access to the bus. Messages are small, at most eight bytes, and are protected by checksum error detection. Each message carries a numeric value which controls its priority on the bus, and may also serve as an identification of the contents of the message. CAN offers an error handling scheme that results in retransmitted messages when they are not properly received.

The SAE J1587 protocol relates to data exchange between microcomputers in heavy duty vehicle applications. The protocol defines formats for message and data, including field description, size, scale, internal data representation and position within a message. Guidelines for message transmission frequency and circumstances are provided. Message formats can be published for information pertaining to vehicle operation and vehicle component performance, diagnostic and maintenance data, among other things. The protocol is used in conjunction with the SAE J1708, which defines requirements for hardware.

Many electronic control modules also maintain accumulation register data or information, such as odometer readings, that are updated constantly and restored in memory.

If one of these modules fails for any reason and needs to be replaced, the programmable parameters and accumulation register data must be manually reentered into the new module, using a specific service tool for each type of electronic control module.

The present inventors have recognized the need for providing a system and method for more easily restoring programmable parameter and accumulation register data into replacement electronic control modules.

SUMMARY OF THE INVENTION

The present invention provides a data storing and transfer system for on-board electronic control modules whereby a new module can be easily updated by receiving pre-stored control parameters and accumulation register data from another on-board control module present on the vehicle.

Much like a local area network, plural electronic modules on a vehicle are attached to a common data link. On commercial vehicles this data link is governed by the SAE J1939 Data Link. Typically, each module has a micro-processor and memory internal to it.

According to the invention, software can be written to maintain a back-up copy of the ECU programmable parameters inside the BC and conversely to maintain a back-up copy of the BC programmable parameters inside the ECU. Now when a module is replaced, the back-up copy, stored locally on the vehicle, can be ported over automatically thereby insuring no data entry errors. If there exists a third module on the vehicle, such as a TCU, the back up data can be stored in two locations thereby providing redundancy and increasing the reliability of the data transfer in the event of a catastrophic module failure. This method also ensures that accumulation register data is accurately reinstalled in the new module and there is continuity of on-board data, such as engine running hours and odometer miles as examples.

Particularly, a method for transferring backup data between on-board electronic modules is provided which includes the steps of: sensing the presence of a parameter default flag at one module during a running of the vehicle engine; storing current engine cycle accumulation register data ("accumulators") for the engine cycle until the engine is next shut down; running a parameter recovery routine wherein parameters for the one module are recovered from memory in another electronic module on the vehicle and stored in the memory of the one module; running a accumulation register data recovery routine wherein stored accumulation register data for the one module is recovered from memory in another electronic module on the vehicle, and adding the current engine cycle accumulation register data to the stored accumulation register data and storing the sum into memory of the one module.

The method is further characterized in that a third module can be used to back-up parameters and accumulation register data for the other two modules.

The method is further characterized in that the electronic modules communicate parameters and accumulation register data via a bus using SAE J1939 protocol.

The invention further includes a method of periodically updating the back-up memories for one module into one or more other modules by running a parameter and data exchange routine wherein during a housekeeping routine such as when the engine is shut down, the one module stores current parameters and accumulation register data into one or more other modules that will serve as back-up parameter and accumulation register data storage in the event the one module looses such parameters and accumulation register data. According to the preferred embodiments, two modules send parameter and accumulation register data pertinent to the sending module to each other to be stored as back-up in the respective receiving module.

The invention provides for fast, accurate, automatic, and reliable replacement of programmable parameters in electronic control modules after a catastrophic failure of an on-board module.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
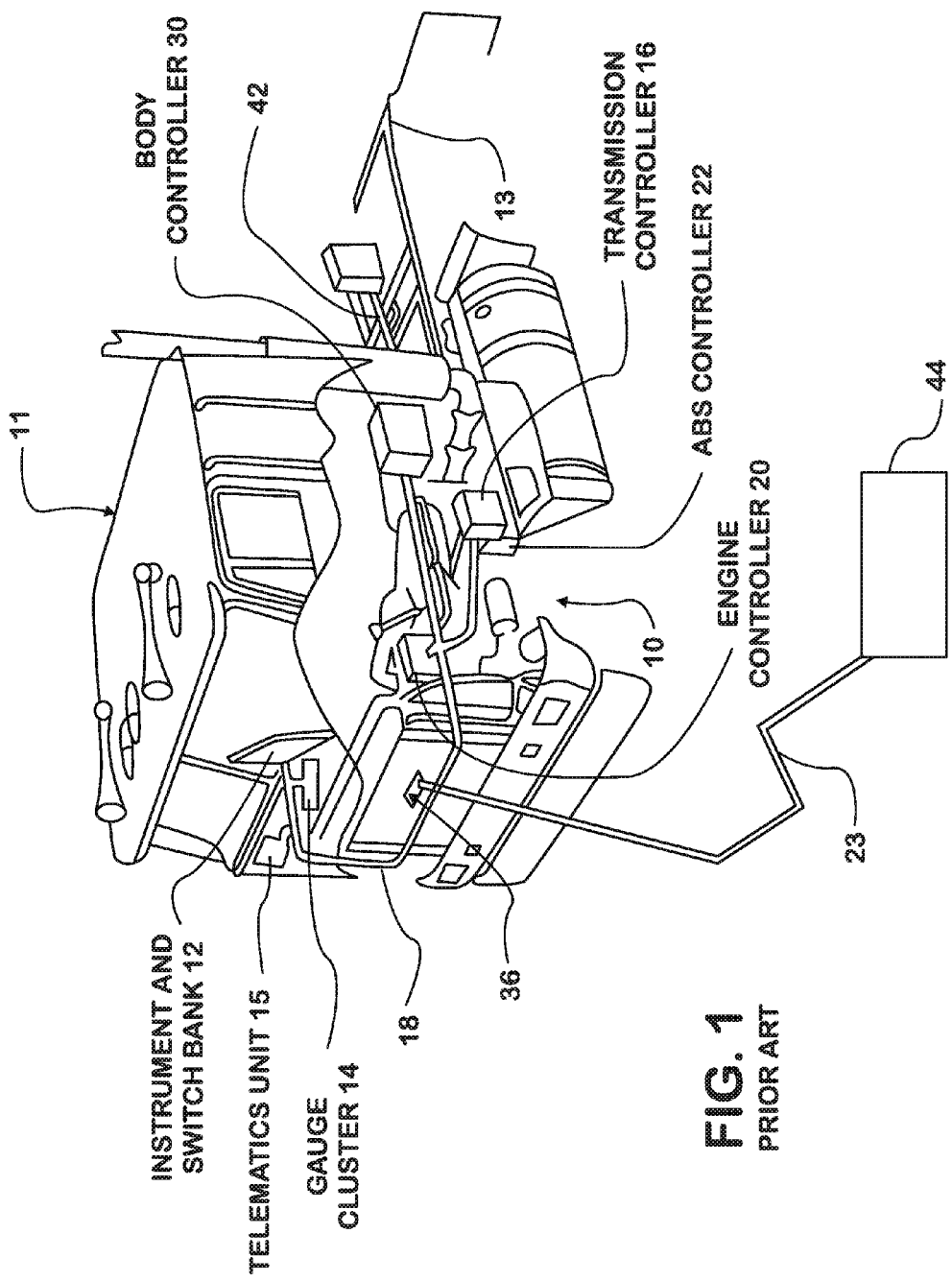
FIG. 1 is an illustration of a vehicle electrical control system in a perspective, partial cutaway view of a truck.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 is a perspective view of a vehicle 11 and of an electrical control system 10 installed on the vehicle and vehicle chassis 13. A more detailed description of an exemplary electrical control system 10 is described in U.S. Pat. No. 6,907,445, herein incorporated by reference.

Vehicle electrical system 10 comprises a network which may, in one embodiment, comprise a twisted pair (either shielded or unshielded) cable operating as a serial data bus 18. One node of bus 18 is a BC 30, which is a major component of a vehicle electronic control system. BC 30 manages a number of vocational controllers connected to bus 18 as nodes. Collectively, bus 18 and the various nodes attached thereto form a controller area network (CAN). Numerous opportunities exist for programming the various controllers. Alternative network classes may be employed.

Active vehicle components are typically controlled by one of a group of autonomous, vocational controllers, which include an instrument and switch bank 12, a gauge cluster 14, a TCU 15, an ECU 20, a transmission controller 16, and an antilock brake system (ABS) controller 22, and a BC 30 all of which are connected via a serial data bus 18 as nodes. The autonomous controllers include local data processing and programming and are typically supplied by the manufacturer of the controlled component. For each autonomous controller there is a defined set of variables used for communications between the autonomous controller and other data processing components on the network or attached to the network.

Bus 18 is preferably a twisted pair cable constructed in accordance with SAE standard J1939 and is externally accessible via a diagnostic port 36. Diagnostic port 36 is typically located under the steering column inside the cab of vehicle 13, but may be located elsewhere. Although the autonomous controllers handle many functions locally and are functionally defined without reference to BC 30, they may report data to BC 30 and may receive operational requests from BC 30. Gauge cluster 14, transmission controller 16 and engine controller 20 all may communicate with BC 30, which also monitors inputs received from the auxiliary instrument and switch bank 12 over the serial communication link in harness 18. For a CAN system a J1939 compliant cable 23 is connected from port 36 to a remote data link computer 44.

Figure 2:
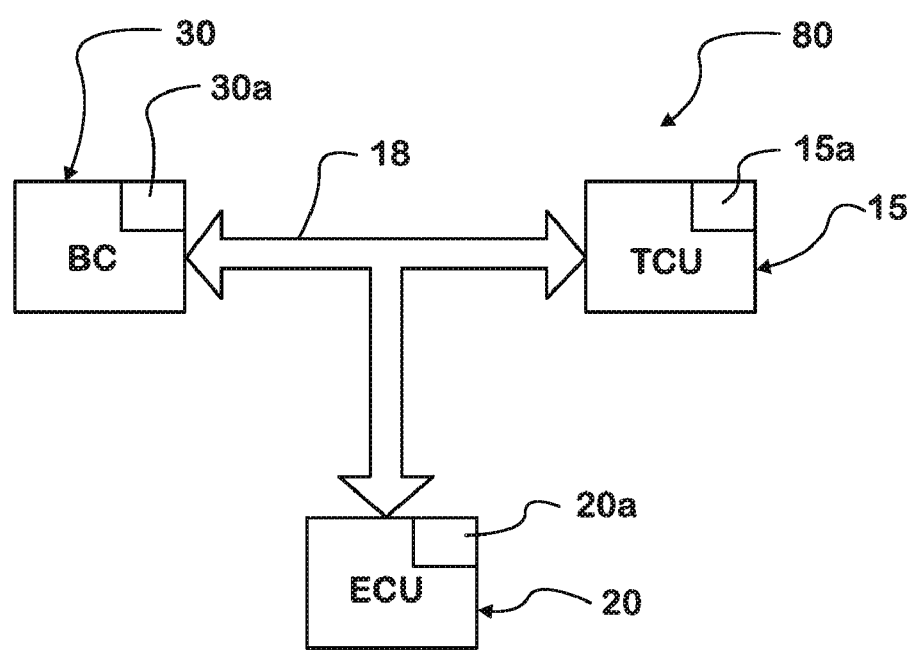
FIG. 2 is a component block diagram of a network used to implement the invention.

FIG. 2 is a block diagram of a backup data restoring system 80. The BC 30, the TCU 15 and the ECU 20 can transfer data between each respective other unit along the bus 18. Each electronic control unit 30, 15, 20 includes control circuitry and a memory. The BC 30 includes a BC memory 30a, the TCU 15 includes a TCU memory 15a, and the ECU 20 includes a ECU memory 20a. Each of the memories 30a, 15a, 20a includes a memory allocated for storing programmable parameters and a memory allocated for storing accumulation register data.

According to the preferred embodiment, the BC memory 30a and the TCU memory 15a each also includes a memory storage space allocated to store a backup of the programmable parameters and accumulation register data of the ECU 20. Likewise, the ECU memory 20a also includes a memory storage space allocated to store a backup of the programmable parameters and accumulation register data of the BC 30, the TCU 15 or other electronic control module that is on the vehicle. In this regard, if the ECU 20 is replaced, the memory 20a of the replacement ECU 20 can be reloaded according to current programmable parameters and accumulation register data of the replaced ECU that has malfunctioned. Likewise, when a BC 30 (or other electronic control unit on the vehicle) is replaced, the memory 30a of the replacement BC 30 can be reloaded according to current programmable parameters and accumulation register data of the replaced BC that has malfunctioned.

Figure 3:
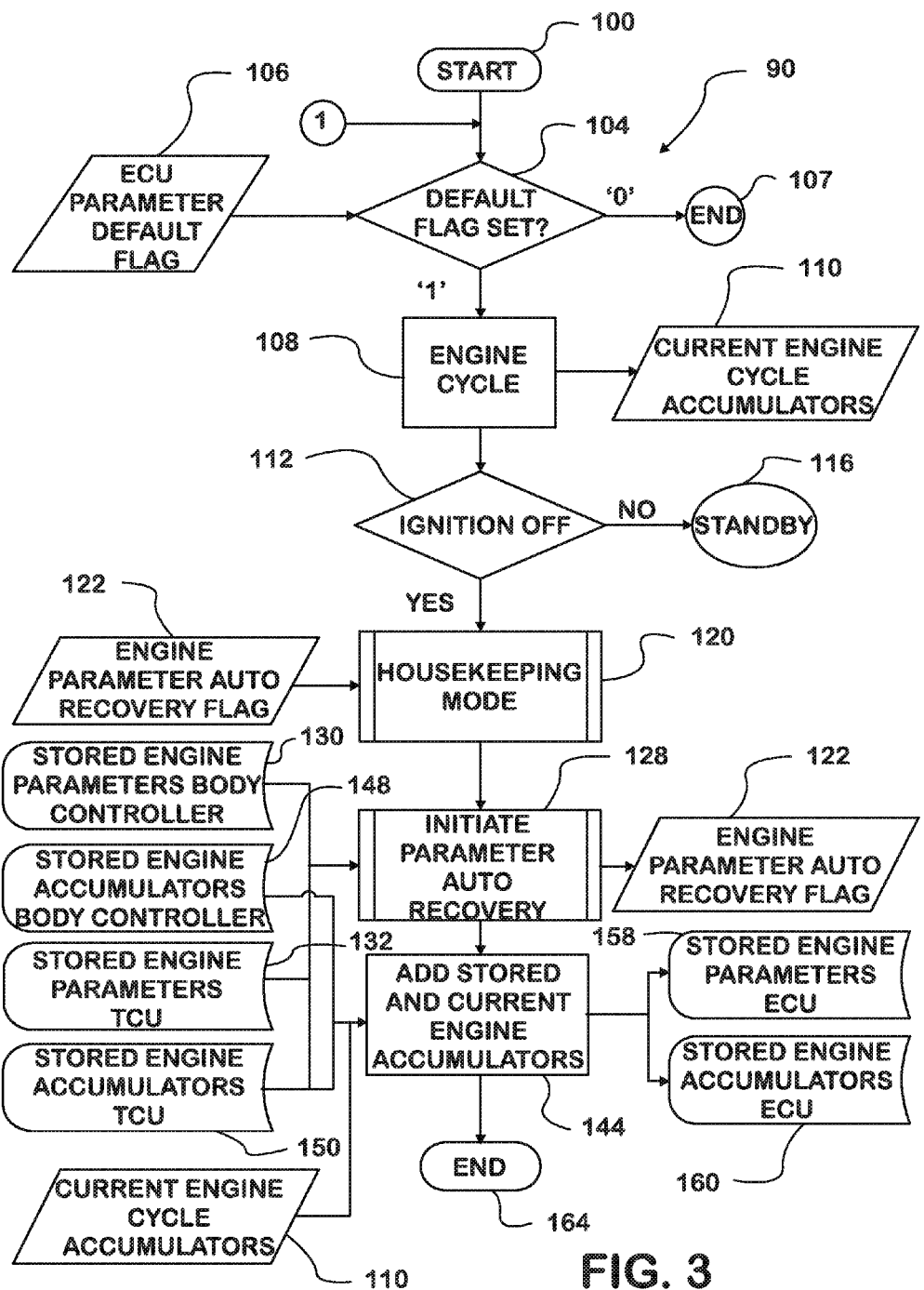
FIG. 3 is a first algorithm block diagram of a control system used by the network to implement the invention.

FIG. 3 is a block diagram of a method 90 of restoring engine parameters and accumulation register data into an ECU 20 from data stored in memory in either an on-board BC 30 or an on-board TCU 15. Particularly, when a replacement ECU is installed on a vehicle, it must be updated with all of the programmable parameters and accumulation register data which would have been present in the replaced ECU before it malfunctioned.

Initially, the engine is started and run in the normal course of operation at step 100. The ECU 20 monitors for a default flag at step 104 corresponding to an ECU malfunction, loss of stored ECU parameters in memory or the presence of a new ECU. Without stored data the ECU 20 will have a parameter default flag set to "1" at 106. A functioning ECU with data intact on a vehicle will have a default flag set to "0." At step 107, the sensing of the default flag of "0" ends the recovery routine 90.

The engine is run with default parameters for the duration of the engine cycle 108, between starting of the engine and turning off the ignition, and engine accumulators are stored for the engine cycle at 110. During this period the ECU monitors for an off status of the ignition at 112. If the engine remains running during the engine cycle, the housekeeping mode remains on standby at 116. Once the ignition is turned off the housekeeping mode begins at 120. For this housekeeping mode the ignition key must be kept at some pre-defined position or another type switch can be used, or the housekeeping mode continues automatically without operator involvement. Housekeeping mode continually monitors the status of data recovery operation to prevent operator interruption before all of the housekeeping data transfer has been finished. In this regard, an engine parameter auto recovery flag is sensed at 122 and given the presence of this flag, the ECU could be programmed to take preventative steps such as an annunciator or light warning to the operator to not power down the ECU, or the prevention of ECU power down, until the flag is no longer present.

At step 128, the ECU then polls or queries another control unit on the vehicle in a pre-set priority, such as the BC 30 first and the TCU 15 second. The first electronic control unit transfers the backup engine parameters to the ECU memory 20a at step 130 and if the engine parameters are not available from the first electronic control unit, from the second electronic control unit at a step 132. During the transfer, the engine parameter auto recovery flag 122 is created within the ECU.

During the parameters recovery in the ECU, at step 144, stored engine accumulation register data is transmitted from one of the BC 30 or TCU 15 according to a preset priority at step 150 and added to the current engine cycle accumulation register from step 110.

The restored engine parameters are stored in the stored engine parameters in ECU memory 20a at step 158 and the totalized stored engine accumulation register data is stored in the stored engine accumulation register data in the ECU memory 20a at step 160. Once all the data has been transferred, the routine ends at 164.

Figure 4:
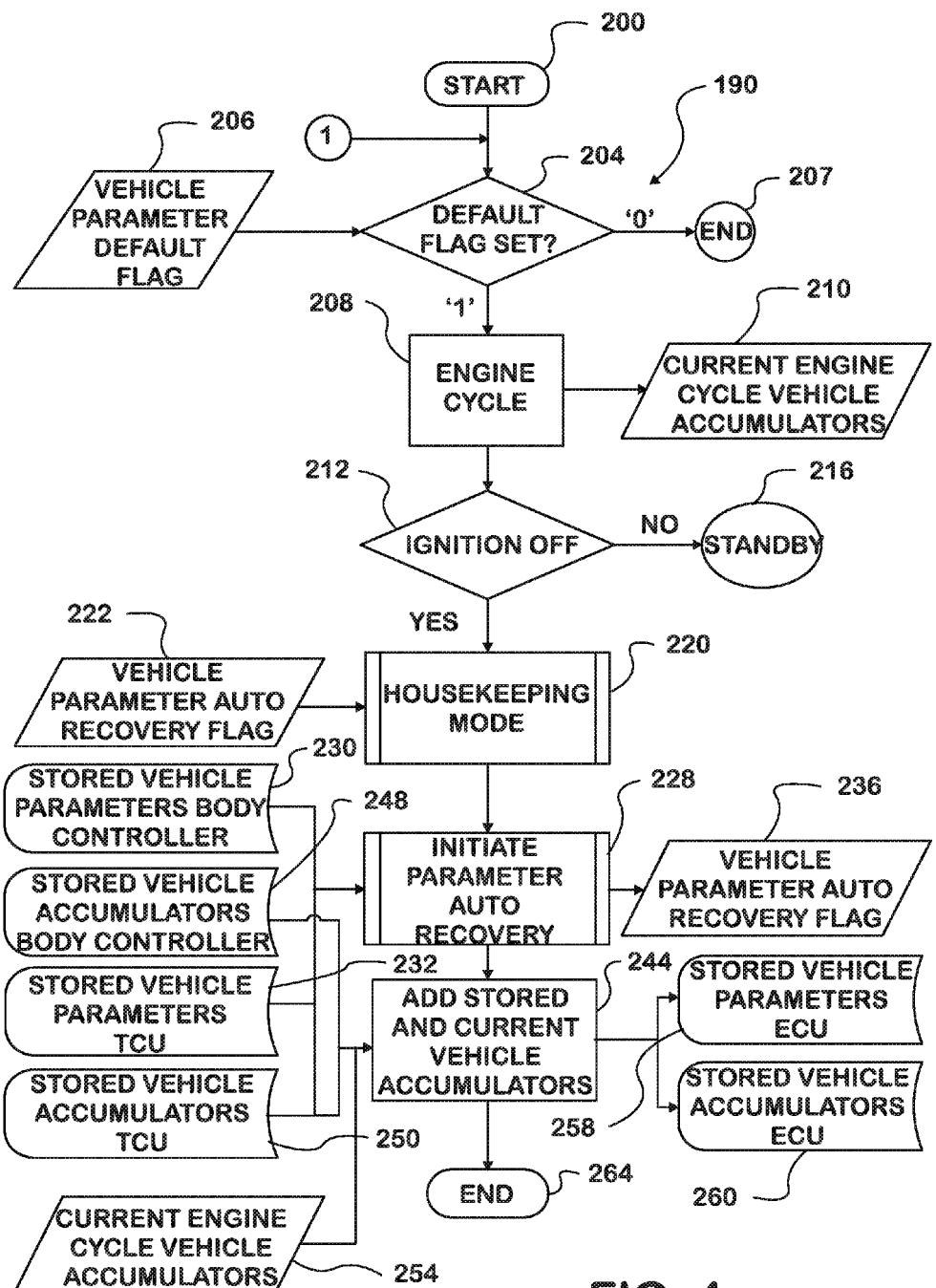
FIG. 4 is a second algorithm block diagram of a control system used by the network to implement the invention.

FIG. 4 is a block diagram of a method 190 of restoring vehicle parameters and accumulation register data into an ECU 20 from data stored in memory in either an on-board BC 30 or an on-board TCU 15. Particularly, when a replacement ECU is installed on a vehicle, it must be updated with all of the programmable parameters and accumulation register data which would have been present in the replaced ECU before it malfunctioned. Because according to the invention the ECU 20 can be used as a backup memory of parameters and accumulation register data for the BC or other electronic module on the vehicle, the parameters and accumulation register data present in the BC 30 for example must be restored as well into the ECU 20.

Initially, the engine is started and run in the normal course of operation at step 200. The ECU 20 monitors for a vehicle parameter default flag at step 204 corresponding to an ECU malfunction, loss of stored vehicle parameters in memory 20a or the presence of a new ECU. Without stored vehicle parameters the ECU 20 will have a parameter default flag set to "1" at 206. A functioning ECU with vehicle parameters intact on a vehicle will have a default flag set to "0." At step 207, the sensing of the default flag of "0" ends the recovery routine 190.

The engine is run with default parameters for the duration of the engine cycle 208, between starting of the engine and turning off the ignition, and vehicle accumulators are stored within the BC memory 30a for the duration of the engine cycle at 210. During this period the ECU monitors for an off status of the ignition at 212. If the engine remains running during the engine cycle, the housekeeping mode remains on standby at 216. Once the ignition is turned off the housekeeping mode begins at 220. For this housekeeping mode the ignition key must be kept at some pre-defined position or another type switch can be used, or the housekeeping mode continues automatically without operator involvement. Housekeeping mode continually monitors the status of data recovery operation to prevent operator interruption before all of the housekeeping data transfer has been finished. In this regard, a vehicle parameter auto recovery flag is sensed at 222 and given the presence of this flag, the ECU could be programmed to take preventative steps such as an annunciator or light warning to the operator to not power down the ECU, or the prevention of ECU power down, until the flag is no longer present.

At step 228, the ECU then polls or queries another control unit on the vehicle in a pre-set priority, such as the BC 30 first and the TCU 15 second. The first electronic control unit transfers the backup vehicle parameters to the ECU memory 20a at step 230 and if the vehicle parameters are not available from the first electronic control unit, from the second electronic control unit at a step 232. During the transfer, the vehicle parameter auto recovery flag 222 is created within the ECU.

During the parameters recovery in the ECU, at step 244, stored vehicle accumulation register data is transmitted from one of the BC 30 or TCU 15 according to a preset priority at step 250 and added to the current engine cycle vehicle accumulation register from the BC memory from step 210.

The restored vehicle parameters are stored in the stored vehicle parameters in ECU memory 20a at step 258 and the totalized stored vehicle accumulation register data is stored in the stored vehicle accumulation register data in the ECU memory 20a at step 260. Once all the data has been transferred, the routine ends at 264.

Although FIGS. 3 and 4 describe methods of restoring vehicle control parameters, vehicle accumulation register data, engine control parameters and engine accumulation register data, the same procedures can be used to transfer back up data from the memory 20a of the ECU 20, or the memory 15a of the TCU 15, into the memory 30a of the replacement BC 30.

In order to maintain current back-up data of parameters and accumulation register data of one module within the memories of other modules, the current data must be periodically stored into the memories of the other modules from the one module, and vice-versa. Then, if this one module needs to have its memory restored or replaced, the other "back-up" modules will have stored in memory therein a relatively current set of data for the one module.

Figure 5:
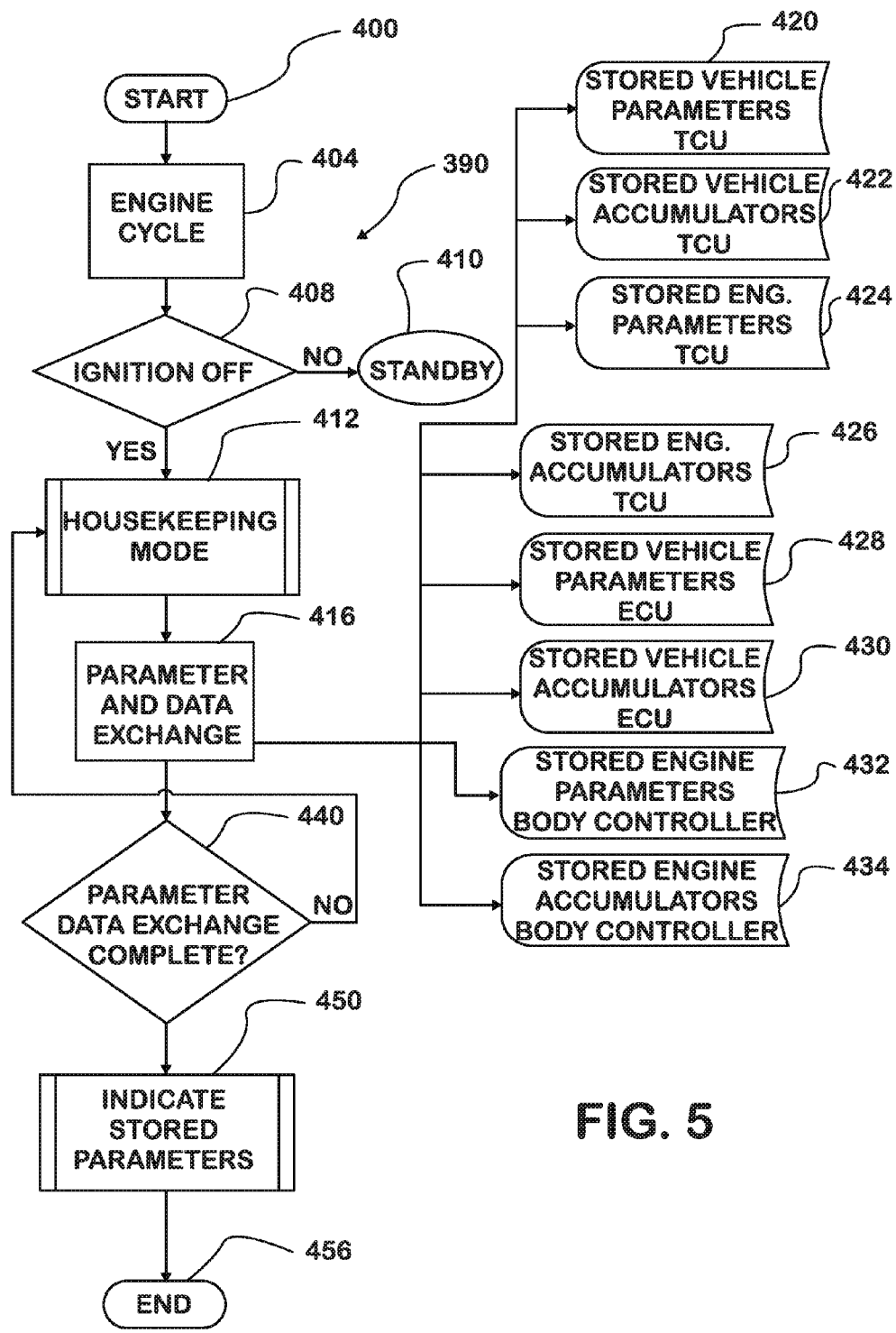
FIG. 5 is a third algorithm block diagram used by the network to implement the invention.

In this regard, FIG. 5 describes the procedure 390 for updating the back-up data in the memories of the respective other modules.

First, the engine is started at step 400 and run for a current engine cycle at step 404. The status of the ignition is monitored at step 408. If the ignition remains on, the housekeeping mode is kept on standby, step 410.

Once it is sensed by the ECU that the ignition has been switched off, the housekeeping mode starts at step 412.

The housekeeping mode begins a parameter and data exchange at step 416.

During the exchange, the TCU memory 15a is updated with current vehicle parameters from the BC memory 30a at step 420, the TCU memory 30a is updated with current vehicle accumulation register data from the BC memory 30a at step 422.

During the exchange, the TCU memory 15a is updated with current engine parameters from the ECU memory 20a at step 424, and the TCU memory 30*a* is updated with current engine accumulation register data from the ECU memory 20*a* at step 426.

During the exchange, the ECU memory 20*a* is updated with current vehicle parameters from the BC memory 30*a* at step 428, and the ECU memory 20*a* is updated with current vehicle accumulation register data from the BC memory 30*a* at step 430.

During the exchange, the BC memory 30*a* is updated with current engine parameters from the ECU memory 20*a* at step 432, and the BC memory 20*a* is updated with current engine accumulation register data from the ECU memory 20*a* at step 434.

The parameter and data exchange status is continuously monitored and housekeeping mode is intended to be sustained until finished. In this regard, a housekeeping flag can be created and given the presence of this flag, the ECU could be programmed to take preventative steps such as an annunciator or light warning to the operator to not power down the ECU, or the prevention of ECU power down, until the flag is no longer present.

Once the data and parameters have been exchanged, an indicator is given to the operator at step 450 and the procedure ends at step 456.

The above recited data and parameter exchange can take place every time the engine is turned off by turning off the ignition, or at some other pre-set interval.

While the invention is shown in only one of its forms, it is not thus limited but is susceptible to various changes and modifications without departing from the spirit and scope of the invention.

What is claimed is:

1. A method for transferring back-up data between on-board electronic modules of a vehicle includes the steps of:
    on a vehicle, providing a first electronic module and a second electronic module in signal communication;
    sensing the presence of default parameters at said first electronic module during a running of the vehicle engine for an engine cycle;
    storing current engine cycle accumulation register data for the engine cycle in said first electronic module;
    running a parameter recovery routine wherein parameters for the first electronic module are recovered from memory in said second electronic module on the vehicle and stored in the memory of the first electronic module; and
    running an accumulation register data recovery routine wherein stored accumulation register data for the first electronic module is recovered from memory in said second electronic module on the vehicle, and adding the current engine cycle accumulation register data to the stored accumulation register data and storing the sum into memory of the first electronic module.

2. The method according to claim 1 further characterized in that the first and second electronic modules communicate parameters and accumulation register data via a bus using SAE J1939 protocol.

3. The method according to claim 1 wherein said first electronic module comprises an engine control unit and said second electronic module comprises a body controller.

4. The method according to claim 1 comprising the further steps of:
    periodically running a parameter and data back-up routine wherein said first electronic module stores current parameters and accumulation register data into memory of said second electronic module that will serve as back-up parameter and accumulation register data storage in the event said first electronic module loses such parameters and accumulation register data.

5. The method according to claim 4, wherein during said back-up routine said first electronic module and said second electronic module send parameter and accumulation register data pertinent to each respective electronic module to the respective other electronic module to be stored as back-up in the respective other electronic module.

6. The method according to claim 5, wherein said first electronic module comprises an engine control unit and said second electronic module comprises a body controller.

* * * * *